(12) United States Patent
Holfelder et al.

(10) Patent No.: US 8,578,036 B1
(45) Date of Patent: Nov. 5, 2013

(54) PROVIDING STANDARDIZED TRANSPARENCY FOR COOKIES AND OTHER WEBSITE DATA USING A SERVER SIDE DESCRIPTION FILE

(75) Inventors: Wieland Holfelder, Planegg (DE); Dominic Battré, Munich (DE); Michael Christopher West, Munich (DE); Jochen Mathias Eisinger, Munich (DE); Bernhard Bauer, Munich (DE); Patrick Louis Maurice Nepper, Rosenheim (DE); Pamela Greene, Munich (DE); Adam Barth, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/532,253

(22) Filed: Jun. 25, 2012

Related U.S. Application Data

(63) Continuation of application No. 13/297,002, filed on Nov. 15, 2011, now abandoned.

(60) Provisional application No. 61/559,522, filed on Nov. 14, 2011.

(51) Int. Cl.
*G06F 13/00* (2006.01)

(52) U.S. Cl.
USPC .......................... 709/228; 709/204; 709/224

(58) Field of Classification Search
USPC ................. 709/204, 206, 223, 224, 227, 228
See application file for complete search history.

(56) References Cited

U.S. PATENT DOCUMENTS

| | | | |
|---|---|---|---|
| 7,827,290 B2 | 11/2010 | Galvin et al. | |
| 8,230,046 B2 * | 7/2012 | Jiang | 709/219 |
| 2002/0023053 A1 * | 2/2002 | Szoc et al. | 705/39 |
| 2009/0282000 A1 * | 11/2009 | Bennett | 707/3 |
| 2010/0153516 A1 | 6/2010 | Weinberg et al. | |
| 2010/0198911 A1 | 8/2010 | Zhang et al. | |
| 2011/0131503 A1 * | 6/2011 | Graham, Jr. | 715/744 |
| 2011/0208840 A1 | 8/2011 | Blackman | |
| 2012/0317652 A1 * | 12/2012 | Kiley et al. | 726/27 |

* cited by examiner

*Primary Examiner* — Viet Vu
(74) *Attorney, Agent, or Firm* — Sterne, Kessler, Goldstein & Fox PLLC (57) ABSTRACT

A system and a computer-implemented method for processing a cookie description file are provided. A browser provides the cookie description file that includes meta-information associated with cookies that are associated with a domain. The meta-information includes cookie information specific to each cookie. The cookie description file is parsed and the meta-information associated with each cookie is extracted. The parsed meta-information is displayed in a user-readable format on a client device.

12 Claims, 7 Drawing Sheets

PROVIDING STANDARDIZED TRANSPARENCY FOR COOKIES AND OTHER WEBSITE DATA USING A SERVER SIDE DESCRIPTION FILE

This application claims the benefit of U.S. patent application Ser. No. 13/297,002, filed on Nov. 15, 2011, now abandoned and is incorporated by reference in its entirety. This application also claims the benefit of the U.S. Provisional Application No. 61/559,522 filed on Nov. 14, 2011 and is incorporated by reference in its entirety.

BACKGROUND

As users browse websites accessible via the Internet or the World Wide Web, (or simply the "Web") they download content from web resources onto their computing devices. Typically, users download web content using an Internet protocol such as a HyperText Transfer Protocol ("HTTP"). Because Internet protocols such as HTTP are stateless protocols, each request and response message in the protocol is atomic. Because of the atomic nature of protocols, a web server cannot determine that two requests were made from the same client or are related in any way.

Cookies store state information that is transmitted between a client and a web server. A web server sends cookies to a client. Typically, the cookie information is included in the HTTP message that downloads resources from the web server to the client. Each cookie comprises a name-value pair and optional attributes. The value of a name-value pair stores the state information for a particular name. When a user subsequently requests a resource from a web server, the client sends another HTTP request to the web server. This HTTP request includes cookies and the state information associated with the cookies from previous requests. Based on the state information included in the cookie, a web server generates an HTTP response that includes resources specific to the client. The web server then transmits the HTTP response to the client.

Some cookies can be used to track the activities of a user as the user browses the Web. A user may not want to have his browsing activities tracked by cookies and thus does not want to store those cookies on his computing device. Conventional browsers provide a solution by allowing a user to manage cookies that are stored locally on a client. Typically, cookies may be identified by their attributes, such as a domain, a path, and/or a name. Based on these identifying attributes, conventional browsers allow a user to configure a set of rules that determine whether a domain has permission to store cookies on the computing device. For example, a user may configure a browser to reject cookies that are received from a website http://example.com, but accept cookies from a website such as http://example.net. In another example, a user may configure the browser to accept a cookie having a particular set of attributes from a website http://example.net but reject another cookie from the same website having a different set of attributes.

However, this approach often does not provide enough transparency to the user about the purpose for which a particular cookie is stored on a computing device. For example, the name of the name-value pair of a cookie may not be human-readable and/or may contain opaque strings of text. Because cookie information typically is not human-readable, users often cannot make an informed decision about which cookies they prefer to store or to block on their client devices.

BRIEF SUMMARY

A system and a computer-implemented method for processing a cookie description file are provided. A browser provides the cookie description file that includes meta-information associated with cookies that are associated with a domain. The meta-information includes cookie information specific to each cookie. The cookie description file is parsed and the meta-information associated with each cookie is extracted. The parsed meta-information is displayed in a user-readable format on a client device.

In a further embodiment, based on a displayed meta-information the client device receives an action for processing one or more cookies.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Figure 1A:
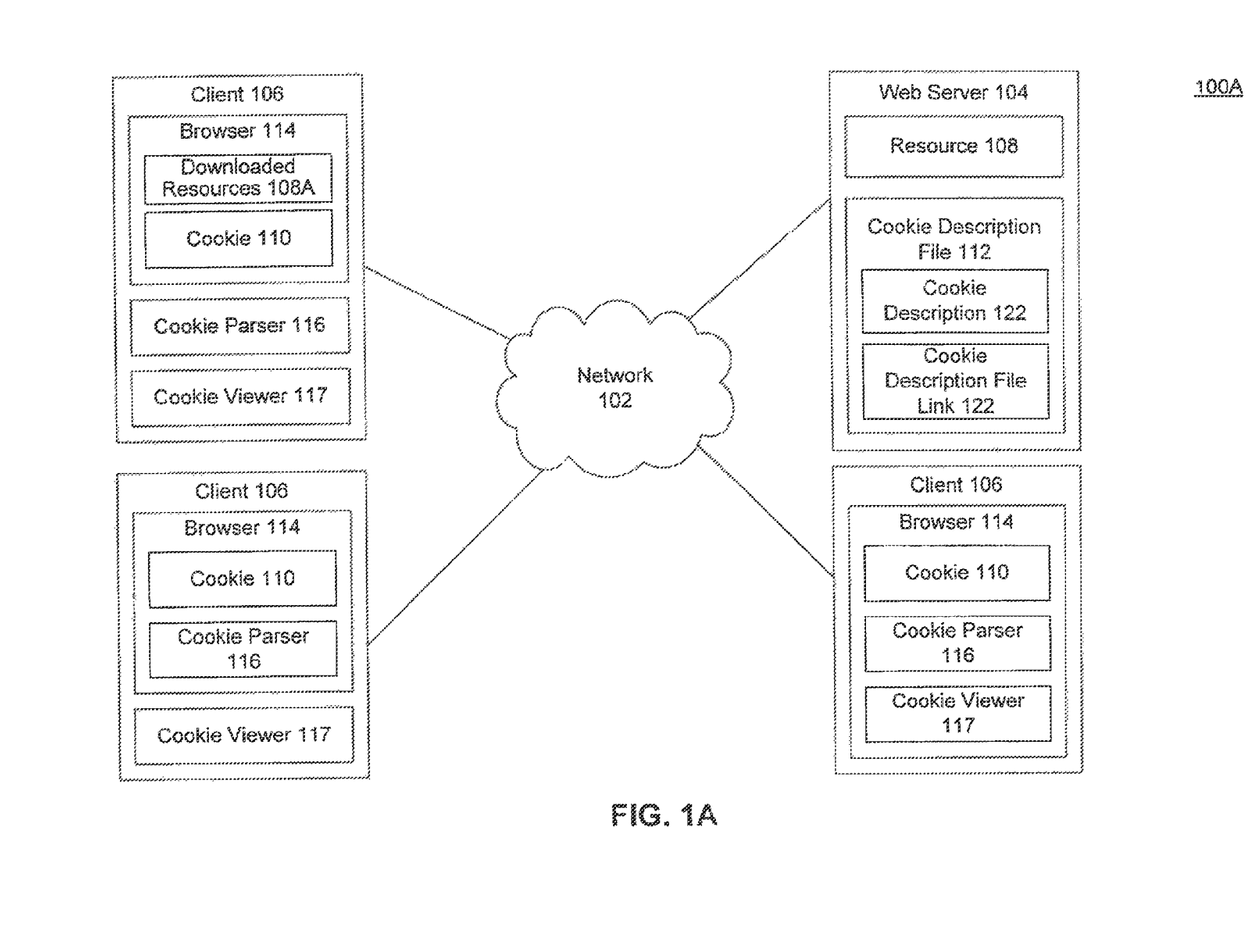
FIGS. 1A-B are block diagrams showing a client-server system in which embodiments of the invention can be implemented.

FIG. 1A is a block diagram of a client-server environment 100A. Client-server environment 100A includes one or more networks 102, web servers 104, and clients 106.

Network 102 may be any network or combination of networks that can carry data communication. Such a network 102 may include, but is not limited to, a local area network, metropolitan area network, and/or wide area network together forming the Internet. Network 102 can support technologies including, but not limited to, World Wide Web (or simply the "Web") that provide access to services and applications using protocols, such as a HyperText Transfer Protocol ("HTTP"). Intermediate web servers, gateways, or other servers may be provided between components of the system shown in FIG. 1A, depending upon a particular application or environment.

Web server 104 is a computing device or an application executing on a computing device that hosts multiple resources 108. A resource 108 is any data that can be provided over network 102. Resource 108 is identified by a resource address that is associated with resource 108. Resources 108 include webpages such as HyperText Markup Language (HTML) pages, scripts, word processing documents, portable document format (PDF) documents, images, and video, to name only a few. Resources 108 can also include content, such as words, phrases, images and sounds, that may include embedded information (such as meta-information in hyperlinks) and/or embedded instructions (such as JavaScript scripts).

Multiple web servers 104 may be combined in a domain. A domain includes multiple web servers 104 that can receive and process a request message, such as an HTTP request message, for a particular resource 108 and transmit the same resource to client 106.

Client 106 is an electronic computing device that is manipulated by a user and is capable of requesting and receiving resources 108 over network 102. Example clients 106 are personal computers, mobile communication devices, and tablet computers. Client 106 typically includes an application, such as a web browser (or simply "browser") 114. Browser 114 may appear in the manifestation of a standalone application or may be embedded in another application. A user uses browser 114 to request resources 108 over network 102. For example, a user requests resource 108 by typing the website address associated with resource 108 that is stored on web server 104. In response to the request message, web server 104 transmits resource 108 to client 106. Resource 108 that is transmitted and stored on client 106 is a downloaded resource 108A. A person skilled in the art will appreciate that downloaded resource 108A may be a subset or a copy of resource 108 that is hosted on web server 104. Resource 108A may be static or may be dynamically generated when server 104 receives the request message.

The response message for resource 108 may include cookies 110 (also referred to as "HTTP cookies", "web cookies" or "browser cookies".) When client 106 downloads resource 108 from web server 104 within a particular domain, cookie 110 may be included in the header of the HTTP response message that includes resource 108. When downloaded to client 106, cookie 110 may be stored in a memory accessible to browser 114. Similarly, when client 106 subsequently sends an HTTP request message to web server 104, cookies 110 may also be included in the header of the HTTP request message.

Cookies 110 provide information available on client 106 to web server 104. For example, a person skilled in the art will appreciate that the HTTP used to transmit resources 108 between web server 104 and client 106 is a stateless protocol. As a result, when browser 114 on client 106 makes two separate requests to web server 104, web server 104 cannot identify that the two requests were made by the same browser 114. When browser 114 includes cookies 110 in the request, cookies 110 allow web server 104 to process the request based on the information provided in cookies 110. For example, web server 104 may generate resource 108 based, at least in part, on the information provided by cookies 110.

Cookies 110 are tokens that include a name-value pair and optionally other attributes, such as, for example, cookie expiration dates. As a user uses browser 114 to access resources 108, the names in cookies 110 may be populated with a particular value. For example, the value in cookie 110 may be populated with a user identifier. The user identifier is specific to cookie 110 that is stored on a particular client 106. The user identifier may map to the user identifier on web server 104. In an online store website, for example, a user identifier may map to a list of items that a user selected through an online store. When a user causes browser 114 to access resource 108 that includes a webpage where a user pays for the items in the shopping cart, browser 114 sends an HTTP request message to web server 104 that hosts the payment processing webpage. The request message includes cookie 110 which includes a user identifier in a name-value pair. Once web server 104 receives the request that includes cookie 110, web server 104 processes the request message based on the values included in cookie 110. For example, web server 104 may extract the user identifier from the name-value pair included in cookie 110 and retrieve the list of items that a user selected to purchase.

In another example, a value in a name-value pair in cookie 110 may include user authentication or session identification information that is stored on client 106. When web server 104 receives cookie 110 that includes user authentication or session identification in a name-value pair, web server 104 grants or denies access to a user using client 106 based on the information stored in the value.

In addition to name-value pairs that store state information, cookie 110 includes multiple attributes. For example, cookie 110 may include a domain attribute and a path attribute. The domain attribute identifies the domain that is associated with cookie 110. For example, browser 114 may include cookie 110 in a request message to web server 104 that is located in a domain included in cookie 110.

The path attribute further limits the web address to which client 106 may transmit a request that includes cookie 110.

In another example, cookie 110 may include an expiration date attribute. The expiration date attribute determines when cookie 110 may be deleted from the memory associated with browser 114. In one embodiment, expiration date may be measured in seconds from the time cookie 110 was created.

Figure 6:
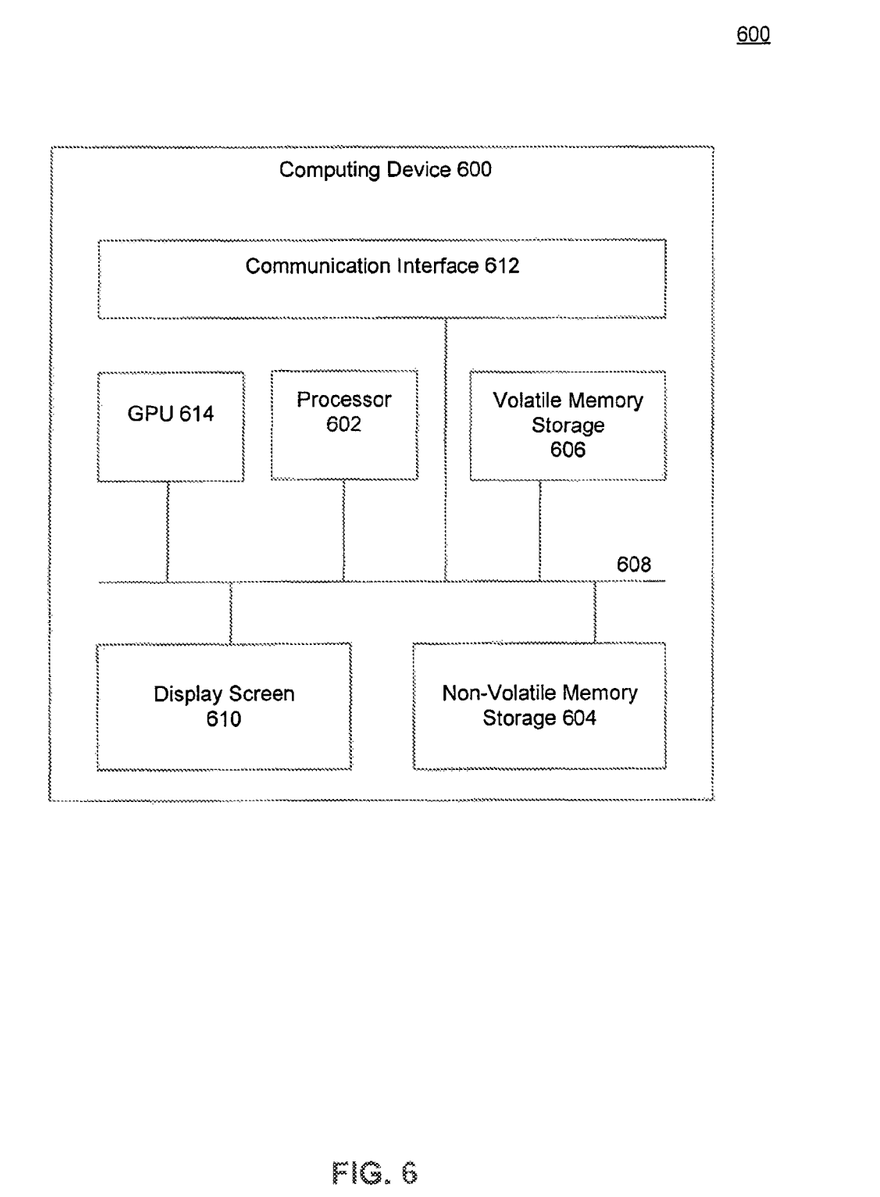
FIG. 6 is a block diagram of a computer system in which embodiments of the invention can be implemented.

When browser 114 receives cookies 110 included in resource 108, browser 114 stores cookies 110 in a memory storage on client 106 (described in detail in FIG. 6). Typically, cookies 110 are stored in the memory storage that is accessible to browser 114. Conventional systems allow a user to use a browser to store and delete cookies. For example, a user may delete cookies from the memory associated with a browser. In another example, a user may use a browser to create, delete and modify a set of rules that control access of cookies to the client. For example, a user may set up a rule that allows a browser to store cookies from website www.example.com, but not from website www.example.org. In another example, a user may configure a rule to notify the user when browser receives a particular cookie, and allow a user to accept or block the cookie. In another example, a user may set up a rule that blocks some or all cookies from being stored on the client. A person skilled in the art will appreciate, that, when a browser blocks a cookie from being stored on a client, a resource, such as an HTML webpage may still be displayed by a browser. A server, however, that generates a webpage in response to a request that includes cookies, may be unable to generate the webpage without receiving cookies from a browser.

A person skilled in the art will appreciate that blocking some cookies from being stored on a client may be beneficial to a user. For example, cookies may be stored on a client that track the browsing activities of a user. When a user does not wish to have his browsing activities tracked by a particular cookie, a user may set up a rule to block the cookie.

An example of a cookie that tracks the browsing activities of a user is a third-party cookie. Advertisers may use a third-party cookie to determine websites that a user frequently visits. Based on those third-party cookies, an advertiser may compile a browsing history of a user, and use the browsing history to present electronic advertisements to a client that are targeted to a particular user.

A third-party cookie may be downloaded onto a client through a request for resource. For example, a conventional HTML page may refer to a tracking pixel, a tiny image that is invisible to the user but causes an HTTP request message to be routed to the hosting third-party web server. Typically, the third-party web server is outside of the domain of a web server that receives an original request message for a webpage from the browser. When a conventional browser processes the image, the conventional browser makes a request for the resource that is included in the reference. In response to the request, the browser receives a response message that includes a third-party cookie. The third-party cookie may include a user identifier in a name-value pair, that unless blocked by the user-set rules on a browser, is stored on a client.

Once a conventional browser stores a third-party cookie, the third-party cookie relays browsing activities of a user to the third-party server. For example, when a user requests a resource from a different web server that includes the same tracking pixel, the browser sends a request to the third-party web server. The request may include a third-party cookie that stores a user identifier and a web address of the web server that included the tracking pixel. The third-party web server may then aggregate the user identifier and the web addresses, and thus track the browsing habits of a user.

In conventional systems, when a user uses a browser to create rules that accept or block cookies, a user may not always know the purpose of a particular cookie. For example, the contents of cookies are usually not human-readable, or the purpose of the cookie may not be identifiable from the cookie. This results in a user configuring a browser to block beneficial cookies from the client, while allowing harmful cookies access to the client.

Some conventional systems attempt to make the purpose of each cookie that is stored on a client transparent to the user. For example, a Platform for Privacy Preferences Project (also referred to as "P3P") is a protocol that allows a website to declare its intended use of information that the website collects about the browsing habits of the users. For example, P3P assigns machine-readable policies to conventional cookies. A user using a computing device, however, cannot determine the content of a P3P policy, as P3P policies are written in a machine-readable code.

Other conventional systems use compilations of websites that provide information about cookies that track the browsing activities of a user. When a user enters a website that is included in the compilation, a user is informed that the website contains known tracking features. A user may also be linked to the webpage that includes the website's privacy policy and/or opt-out pages of the respective companies that own the website or the tracking infrastructure. However, this approach also does not adequately protect the user because it requires constant updates of the compilation, as well as support of website owners to describe their cookies and tracking infrastructure.

To make the purpose of cookies 110 included in a domain transparent to the user, a domain may store a cookie description file 112. Cookie description file 112 may be stored in a well-known location within the domain, that is accessible to clients 106. In one embodiment, a well-known location may include Uniform Resource Identifier ("URI") whose path begins with a string, such as, "/.well-known/". A well-known location may be assessable using "HTTP" or "HTTPS" (also known as HyperText Transfer Protocol Secure) schemes, although other schemes known to a person of ordinary skill in the art may be used as well.

In an embodiment, a single cookie description file 112 may exist in each domain, although multiple cookie description files 112 may exist as well.

Cookie description file 112 stores meta-information for one or multiple cookies 110 that are stored on behalf of a domain. An example meta-information is cookie description 122 that includes a description of a purpose of each cookie 110 or privacy policy associated with each cookie 110 or a website.

Meta-information may include categories associated with cookies 110. Example categories may include shopping cart cookies 110, advertisement cookies 110, login information cookies 110, user preferences 110, etc., to name only a few.

In an embodiment, meta-information may be stored as multiple key-value pairs. Because meta-information may be stored in key-value pairs, cookie description file 112 may be extended to include additional keys as desired by an owner of the domain or the developer of a client. Cookie description file 112 may also include keys that are particular to a domain or client 106.

Cookie description file 112 is available to users upon request. In one embodiment, after receiving cookies 110 from web server 104, a user using client 106 may request cookie description file 112 from web server 104. In another embodiment, browser 114 may issue a request to web server 104 for cookie description file 112 when browser 114 receives at least one cookie 110 associated with the domain. In response, web server 104 sends cookie description file 112 to browser 114. The location of cookie description file 112 may be a "well-known" location that is derived from the domain or a domain/path combination included in cookie 110. The location may also be included in the HTTP response message as part of the response message header or body.

Cookie description file 112 may be written in multiple formats. Example formats may be user-friendly text formats such as an XML format or a JavaScript Object Notation (JSON) format. When the meta-information included in cookie description file 112 is displayed on client 106, a user is provided with a user-readable display of the meta-information that is received by client 106. Based on the meta-information presented to the user, the user may make an informed decision to accept and store, or reject cookie 110 from client 106.

Cookie description file 112 may be generated from cookie names. In one embodiment, cookie names are retrieved from browser 114 executing on client 106. In another embodiment, cookie names may be retrieved from the server log files stored on web server 104. For example, when cookie 110 is requested from, or received by, web server 104, the name of cookie 110 may be recorded in a server log file.

After cookie names are retrieved, a listing is generated with cookie names and the domain or a website that is associated with each cookie 110. Each cookie 110 in the listing is then annotated with meta-information that is particular to each cookie 110. Typically, the meta-information may be configured and/or generated by a system administrator and uploaded to web server 104. Meta-information for each cookie 110 is included as key-value pairs.

The annotated cookie listing is then generated into cookie description file 112. In addition to meta-information for each cookie 110, cookie description file 112 also includes references or links to other cookie description files 112 that also include meta-information associated with other cookies 110. When cookie description file 112 is generated, cookie description file 112 is stored in a well-known location as described above.

A cookie parser 116 parses the contents of cookie description file 112. In one embodiment, cookie parser 116 may parse XML or JSON formats, though a person skilled in the art will appreciate that cookie parser 116 is not limited to those formats. Cookie parser 116 identifies each key included in cookie description file 112 and a value that is associated with that key.

In an embodiment, cookie parser 116 included in browser 114 may be a plug-in application for browser 114 or be downloaded as a standalone application on client 106. Browser 114 may invoke cookie parser 116 when browser 114 is initialized on client 106 or each time browser 114 receives cookie description file 112 from resource 108. Client 106 embodiments in FIG. 1A demonstrate several, and non-limiting implementations of cookie parsers 116.

After cookie parser 116 completes parsing cookie description file 112, cookie parser 116 passes the parsed meta-information to a cookie viewer 117. Cookie viewer 117 may be embedded natively in client 106 to display meta-information and other cookie information to a user on client 106. Cookie viewer 117 may also be a plug-in or extension to browser 114 or may be an independent application that is installed on client 106. Client 106 embodiments in FIG. 1A demonstrate several, and non-limiting implementations of cookie viewers 117.

Figure 1B:
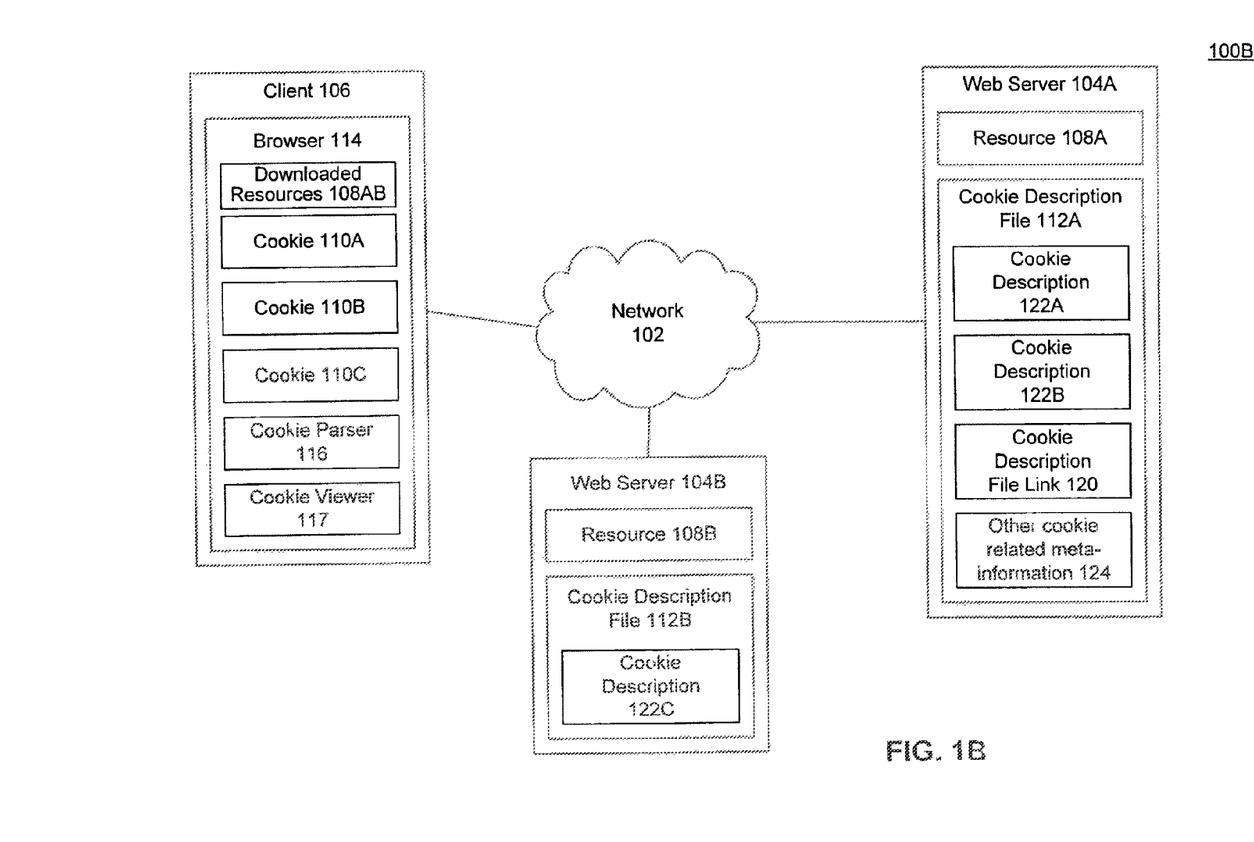

FIG. 1B is a block diagram of a client-server environment 100B. Client-server environment 100B demonstrates an embodiment where cookies 110 may be downloaded from multiple web servers 104. For example, downloaded resources 108AB may include resource 108A from web server 104A, and resource 108B from web server 104B, that are displayed as a single HTML page. Web servers 104A and 104B may be included in the same or different domain.

For example, web server 104A includes resource 108A, whereas web server 104B includes resource 108B. When browser 114 makes a request for resource 108A to server 104A, web server 104A transmits resource 108A to client 106. Along with resource 108A, web server 104A also transmits cookies 110A and 110B to client 106.

As client 106 processes the downloaded resource 108A, resource 108A may include a reference to resource 108B on web server 104B. For example, web server 104A may provide resource 108A that includes a reference to an image that is hosted on web server 104B.

When browser 114 makes a request to web server 104B, web server 104B transmits resource 108B to client 106. Along with resource 108B, web server 104B also transmits cookie 110C to client 106.

When browser 114 receives cookies 110A-C from web server 104A and web server 104B, browser 114 requests cookie description file 112A and cookie description file 112B associated with cookies 110A-C. In a non-limiting embodiment, cookie description file 112A includes cookie information for cookie 110A and cookie 110B, and cookie description file 110B includes cookie information for cookie 110C.

In an embodiment, cookie description file 112A or 112B also includes a cookie description file link 120. Cookie description file link 120 stores a web address, such as a Uniform Resource Locator ("URL"), of another cookie description file 112 that includes cookie information for cookies 110. For example, when cookie description file 112A includes cookie information for cookie 110A, but not cookie information for cookie 110B, browser 114 may use cookie description file link 120 included in cookie description file 112A to access another cookie description file 112 that may include cookie information for cookie 110B.

When browser 114 receives cookie description file 112A, browser 114 may access cookie description file link 120 and send a request to web server 104 that stores the other cookie description file 112.

Figure 2:
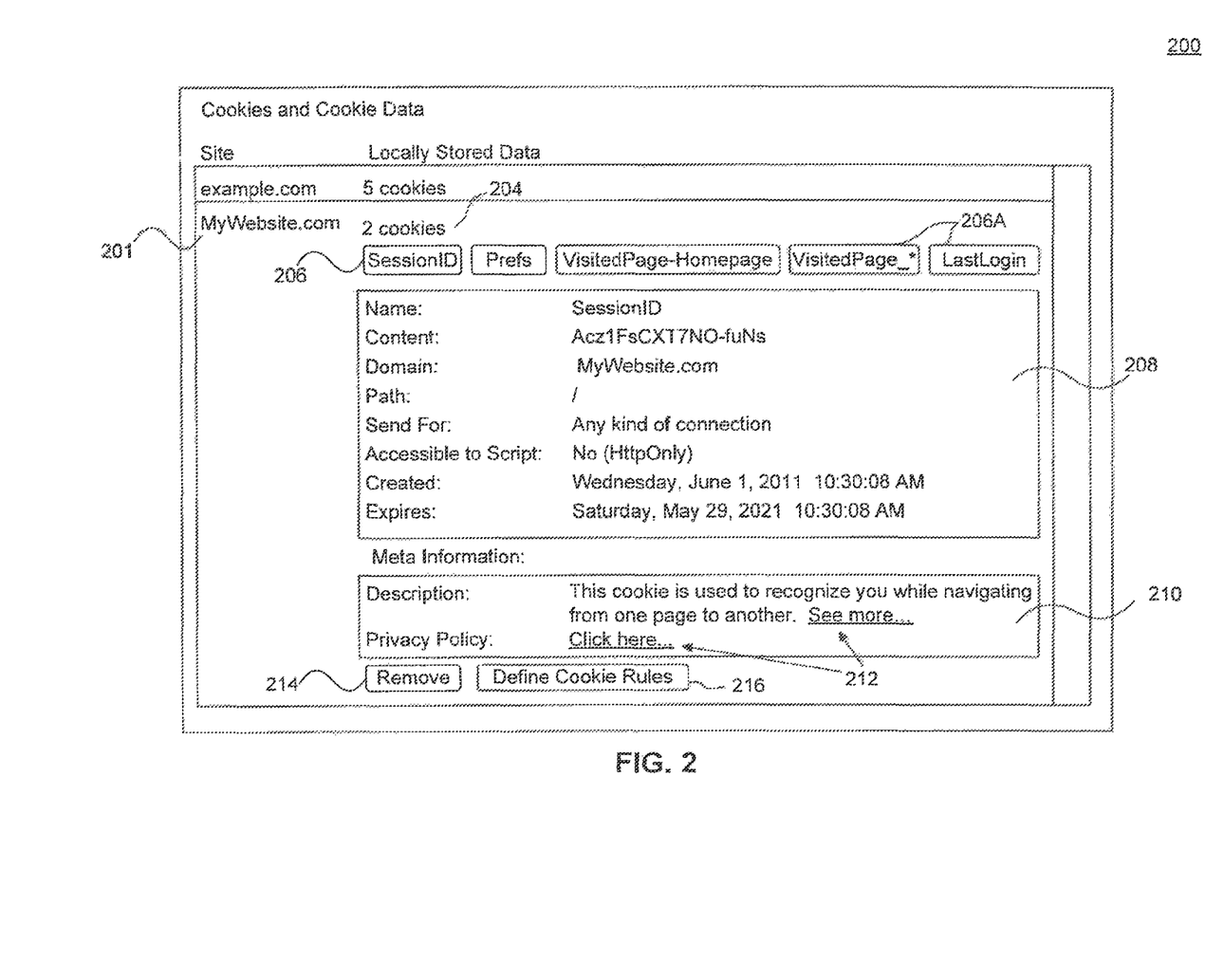
FIG. 2 is a screenshot of an exemplary embodiment of the cookie information contained in cookie attributes and a cookie description file.

FIG. 2 is a screenshot 200 of an exemplary embodiment of the cookie information contained in cookie attributes and a cookie description file. The cookie information included in screenshot 200 enables a user to make a decision to accept or block cookie 110 from client 106. For example, cookie information may be displayed on client 106 after cookie parser 116 parses cookie description file 112 and cookie viewer 117 displays the parsed meta-information.

The code snippet in the exemplary cookie description file that produces cookie information in screenshot 200 is below. In an exemplary embodiment, cookie information for each cookie 110 is included between "{" and "}" in the key-value format.

```
{
"cookies":
 [
   {
     "name": "SessionID",
     "domain": ".MyWebsite.com",
     "path": "/",
     "description": "This cookie is used to recognize you while navigating from one page to another. <a href=\"http://www.mywebsite.com/cookies/SessionID.html\">See more...</a>",
     "privacy_policy_url": "http://www.mywebsite.com/privacy-policy.html"
   },
   {
     "name": "Prefs",
     "description": "This cookie stores your preferences about the website, such as your preferred language. "
   },
   {
     "name": "VisitedPage_(.*)",
     "description": "This cookie stores whether you have visited page $1. "
   }
   {
     "name": "LastLogin",
     "description": "Last time you logged in"
   }
 ]
}
```

Example cookie information included in screenshot 200 may include a domain 201 of a website that includes cookies 110, such as "MyWebsite.com" and "MyWebsite.co.uk". Cookie parser 116 may retrieve value "MyWebsite.com" for domain 201 from key "domain" in the code snippet above.

Screenshot 200 may also include a number of cookies 110 (also referred to as cookie sum 204) stored on behalf of domain 201. Cookie parser 116 may determine the number of cookies from the code snippet above, using, for example, a counter that increments each time cookie parser 116 parses cookies 110.

In screenshot 200, cookie information specific to each cookie 110 may be separated into tabs, such as cookie tabs 206. A user may click on each tab 206 and access information specific to each cookie 110. For example, screenshot 200 displays cookie tab 206 that includes cookie information for cookie "SessionID" that is associated with domain ".MYWebsite.com" and path "/". The cookie description that corresponds to screenshot 200 is included in the code snippet above under cookie name "SessionID".

Each cookie tab 206 includes a cookie attribute display 208. Cookie attribute display 208 includes cookie attributes. Example cookie attributes presented in cookie attribute display 208 may include the name of cookie, content of cookie, the domain that receives cookies 110 from browser 114, a path to a location that restricts for which resource request the cookie 110 is sent, a type of a connection that allows for cookies 110 to be transmitted between web server 104 and client 106, whether cookie 110 is accessible to scripts, dates cookie 110 was created and expires, etc., to name a few. A person skilled in the art will appreciate that cookie information may be data that is typically included in the attributes of cookie 110.

In an embodiment, cookie tab 206 may include cookie information for multiple cookies. For example, when a cookie name in cookie description file includes a wild-card symbol, such as, ".*", cookie tab 206 includes cookie information for cookies 110 that are associated with the wild-card symbol. The wildcard symbol in this example indicates that the corresponding cookie name includes cookie information for cookies 110 that begin with a string "VisitedPage_" preceding the wildcard symbol. For example, for the code snippet above, cookie parser 116 may interpret cookie name "VisitedPage_(.*)" to include a description for cookies "VisitedPage_Home", "VisitedPage_OnlineShop", and other cookie names that begin with a string "VisitedPage_". The wild-card symbol, however, may be included in any place within the cookie name string.

Unlike conventional systems, cookie tab 206 also displays meta-information associated with each cookie 110. As described herein, meta-information associated with each cookie 110 is included in cookie description file 112 using, for example, key-value pairs. Meta-information for cookie 110 may be presented using meta-information display 210. Meta-information may include a cookie description 122. In screenshot 200, the key for cookie description 122 is displayed as "Description" in meta-information display 210. The value for key "Description" may include plain text that describes the purpose of cookie 110. An example value for key "Description" may include information such as "This cookie is used to recognize you while navigating from one page to another. See More . . . ". The value for cookie description may also include a reference or a link, such as link 212. Link 212 allows a user to link to resource 108 that provides a user with additional information for cookie 110. For example, attribute display 208 displays attributes for cookie "SessionID" included in the code snippet above.

Meta-information may also include a privacy policy. In screenshot 200 the key for privacy policy is displayed as "Privacy Policy." The privacy policy typically includes the privacy information associated with cookie 110 or general handling of personal data by domain 201. In an embodiment, a value for key "Privacy Policy" may also include link 212.

In this case, link 212 links a user to a privacy policy associated with resource 108 that a user is trying to access. For example, when a user clicks on link 212 associated with key "description" for cookie "SessionID", client 106 requests resource 108 located at "http://www.mywebsite.com/cookies/SessionID.html" as described in the code snippet above. In another example, when a user clicks on link 212 associated with key "Privacy Policy", client 106 requests resource 108 located at "http://www.mywebsite.com/privacy-policy.html".

A person skilled in the art will appreciate that keys that are included in cookie description file 112 may not be an exact representation of keys that are displayed in a screenshot, such as screenshot 200. Instead, a human-readable (also referred to as "user-readable") version of the key is displayed in screenshot 200, whereas a non-human readable version of the key may be included in cookie description file 112.

When cookie viewer 117 presents a user with screenshot 200, a user is able to review the cookie information and meta-information associated with cookie 110. Based on the cookie information and meta-information 210, a user is able to determine whether to accept, remove and/or block cookie 110 from client 106.

in one embodiment, a user may use a "remove" button 214 to remove a particular cookie 110 from client 106. In another embodiment, a user may decide to use a "Define Cookie Rules" button 216. "Define Cookie Rules" button 216 accesses cookie rule settings included in browser 114. A user may use cookie rule settings in browser 114 to set rules for cookie 110. Example rules may allow cookie 110 to be stored on client 106, remove cookie 110 from client 106 or block cookie 110 from client 106 when client 106 receives a copy of cookie 110 in a subsequent message from web server 104.

In an embodiment, screenshot 200 may also include tab 206A. Tab 206A displays cookie 110 that is included in cookie description file 112, but that is not stored on client 106. However, since cookie description file 112 includes meta-information for cookies 110 that are not stored on client 106, cookie viewer 117 displays meta-information for those cookies 110. After a user views meta-information using tab 206A, a user may preemptively define rules for cookie 110 that is not presently stored on client 106, using, for example, "Define Cookie Rules" button 216. Example cookies 110 that are included in cookie description file, but are not stored on client 106 is cookie "LastLogin" and cookies whose names begin with "VisitedPage_", as disclosed in the code snippet above.

In an embodiment, cookie description file 112 may be obtained in a localized format. For example, when browser 114 requests resource 108 from a domain, the request for resource 108 may include a cookie that stores localized information, such as, for example, a particular language in which resource 108 may be transmitted and displayed on client 106. Alternatively, the request for resource 108 may include the localized information in the header of the request message. A person skilled, in the art will appreciate that the localized information may be obtained from an operating system on client 106 or be stored in browser 114 as part of user preferences or settings.

When browser 114 makes a request for cookie description file 112, browser 114 may access the localized information that it uses to access a localized resource 108, and include the information in the request message for cookie description file 112. When web server 104 processes the request for cookie description file 112 that includes localized information, web server 104 uses the localized information to transmit a localized version of cookie description file 112 to client 106. For example, web server 104 may transmit cookie description file 112 in a particular language to client 106.

Figure 3:
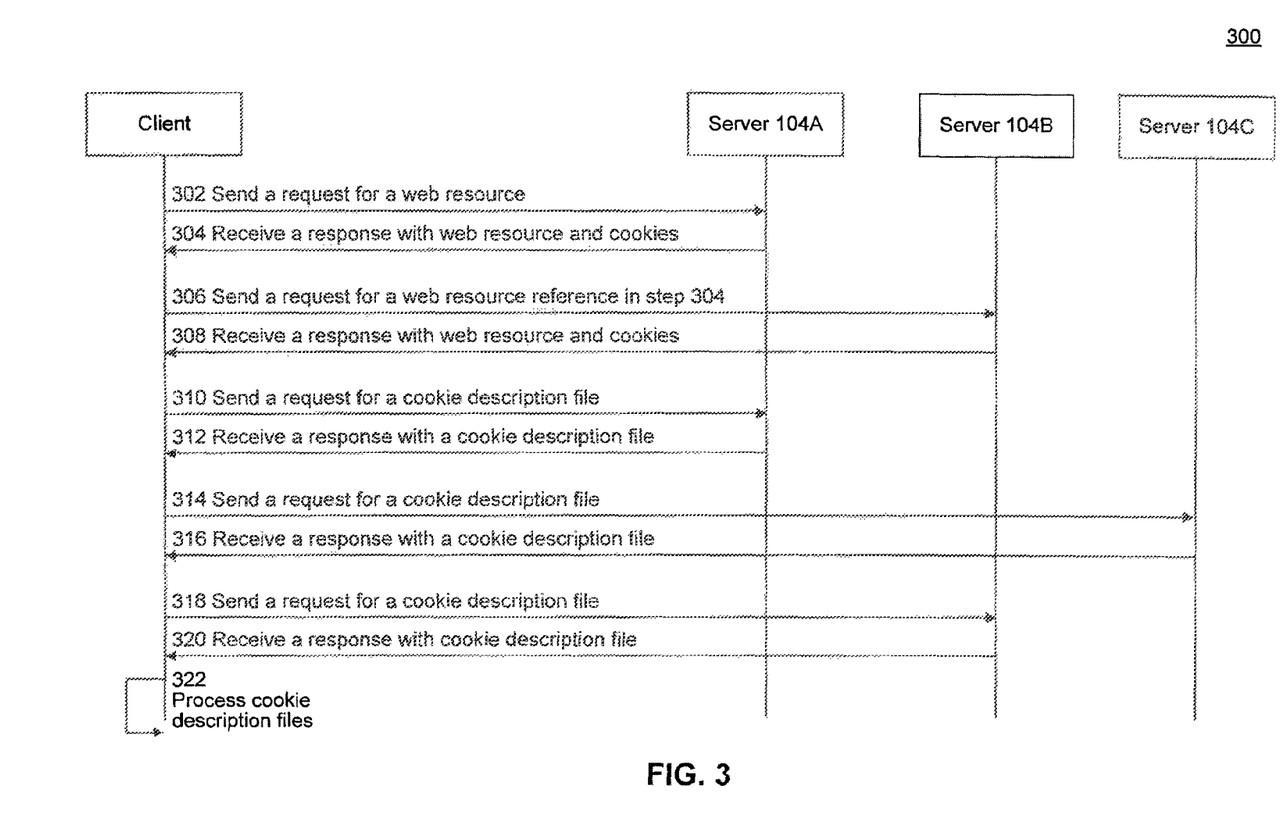
FIG. 3 is an event diagram for retrieving cookie description files from multiple web servers, according to an embodiment.

FIG. 3 is an event diagram 300 for retrieving cookie description files from multiple web servers (stages 302-322), according to an embodiment.

Event diagram 300 includes client 106 and web servers 104A-C that communicate using network 102. Prior to stage 302, cookie description files that include meta-information are created and stored, for example, on web servers 104A, 104B and 104C. Web servers 104A-C may be included in the same or different domain.

At stage 302, a request message for a resource is transmitted. For example, browser 114 on client 106 generates and transmits a request message, such as an HTTP request message, for resources 108A stored on web server 104A.

At stage 304, a response message that includes the resources is transmitted to a client. For example, when web server 104A receives a request message for resources 108A, web server 104A generates a response message, such as an HTTP response message, that includes resource 108A. The response message may also include cookies 110, such as cookie 110A and cookie 110B. When the response message is generated, web server 104 transmits the response message to client 106. When resource 108, such as resource 108A includes references for additional resources 108, such as resources 108B, the flowchart proceeds to stage 306. Otherwise, the flowchart proceeds to stage 310.

At stage 306, a request for additional resources is transmitted. For example, when browser 114 on client 106 receives a response message that includes resources 108A, browser 114 begins to process the response message. When browser 114 identifies references in resource 108A that require additional resources, such as resource 108B, browser 114 generates a request message for resources 108B to web server 104B.

At stage 308, a response message that includes additional resources is received. For example, browser 114 on client 106 receives resource 108B and cookies 110 associated with resource 108B, such as cookie 110C from web server 104B.

At stage 310, a request message for a cookie description file is sent. For example, when client 106 receives resource 108A, browser 114 begins to process resource 108A. When browser 114 identifies that cookies 110, such as cookies 110A-B were received with resource 108A, browser 114 requests cookie description file 112A that includes meta-information associated with the received cookies 110A-B. As described herein, cookie description file 112A may be stored on web server 104A that provided resource 108A or another web server 104.

At stage 312, a response message with a cookie description file is received. For example, browser 114 on client 106 receives cookie description file 112A from web server 104A or another web server 104. Upon receipt, cookie parser 116 begins to parse cookie description file 112 as described herein. When cookie description file 112 includes one or more cookie description file links 120, the flowchart proceeds to stage 314, otherwise the flowchart proceeds to stage 322.

At stage 314, a request for a cookie description file that is included in the cookie description file link is sent. For example, when cookie parser 116 identifies cookie description file link 120 in cookie file 112A, browser 114 generates another request message for cookie description file 112. Browser 114 transmits the request message to a web address included in cookie description file link 120. For example, the web address included in cookie description file link 120 may be for cookie description file 112 located on web server 104, such as web server 104C.

At stage 316, a response message with a cookie description file is received. For example, browser 114 on client 106 receives cookie description file 112 from web server 104C.

At stage 318, another request message for a cookie description file is sent. For example, when resource 108B includes cookie 110, such as cookie 110C, browser 114 generates a request message for cookie description file 112B that includes meta-information for cookie 110C. Once generated, browser 114 transmits the message request to web server 104, such as web server 104B.

At stage 320, the cookie description file is received. For example, browser 114 on client 106 receives cookie description file 112B from web server 104B.

At stage 322, cookie description file is processed. For example, browser 114 begins to process cookie description file(s) 112 received in stage 306, stage 312, stage 316 and stage 320. Stage 322 may occur at any point after cookie description files are received on client 106. For example, browser 114 invokes cookie parsers 116 to parse the meta-information include in cookie description files 112A-B. Once parsed, browser 114 may invoke cookie viewer 117 to display the parsed meta-information.

Figure 4:
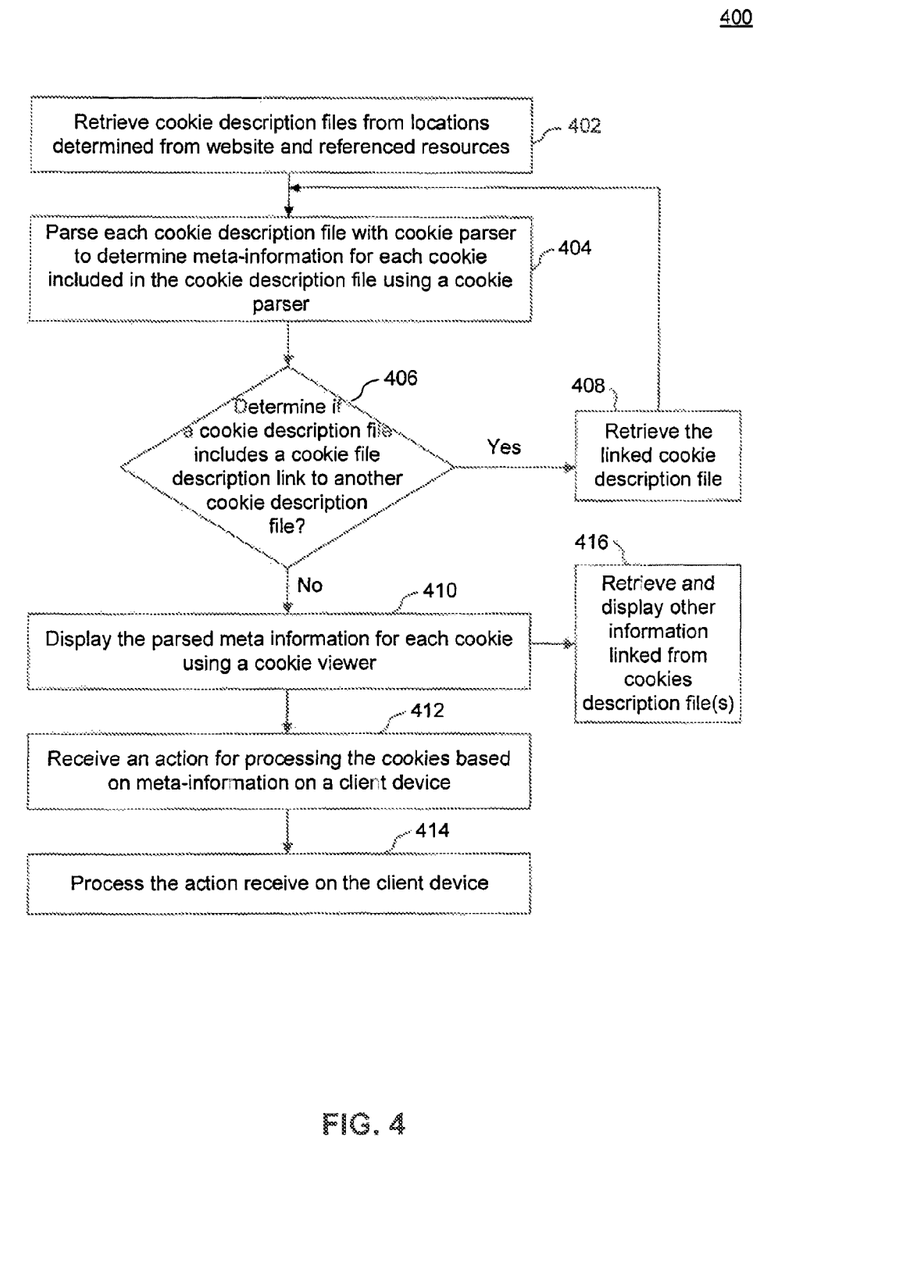
FIG. 4 is a flowchart of a method for processing a cookie description file, according to an embodiment.

FIG. 4 is a flowchart 400 of a method for displaying cookie information included in cookie description file (stages 402-416), according to an embodiment. Based on the displayed cookie information, a user may decide whether to delete, block or allow cookie 110 on client 106.

At stage 402, cookie description files are retrieved. For example, cookie description files 112 are retrieved from a location that is determined from domain 201 and referenced resources, as described herein.

At stage 404, a cookie description file is parsed. When cookie parser 116 receives cookie description files 112, cookie parser 116 parses cookie description files 112 and extracts meta-information associated with each cookie 100 that is described in cookie description file 112. As described herein, for each cookie 110, cookie parser 116 identifies each key included in cookie description file 112 and a value that is associated with that key.

At stage 406, a determination is made as to whether cookie description file includes a cookie description file link to another cookie description file. When cookie description file 112 includes cookie description file link 120, the flowchart proceeds to stage 408, otherwise to stage 410.

At stage 408, a cookie description file accessible using cookie description file link 120 is retrieved. For example, browser 114 sends a request for cookie description file 112 to the web address identified in cookie description file link 120. When browser 114 receives the requested cookie description file 120, the flowchart proceeds to stage 404, described above.

At stage 410, meta-information included in key-value pairs associated with cookies is displayed. For example, cookie viewer 117 displays meta-information on a display screen of client 106. Included in meta-information may be a purpose of each cookie 110, and/or privacy policy associated with each cookie 110 or website associated with domain 201. In an embodiment, client 106 may receive an action from a user to display additional information that may be referenced from the displayed meta-information, using, for example, link 212. When an action is received, the flowchart proceeds to stage 412, otherwise to stage 416.

At stage 412, an action for processing a cookie is received. For example, client 106 receives an action from a user which processes cookie 110 based on the displayed meta-information.

At stage 414, an action is processed. For example, browser 114 stores a rule to store or block cookies 110, or removes cookie 110 based on the action it received in stage 412.

At stage 416, additional information about a cookie is retrieved. For example, browser 114 uses a link to retrieve a resource 108 that provides a user with additional information about cookie 110. Example additional information may include a privacy policy that is applied to resources 108 within domain 201 or the handling of personal data by domain 201.

Figure 5:
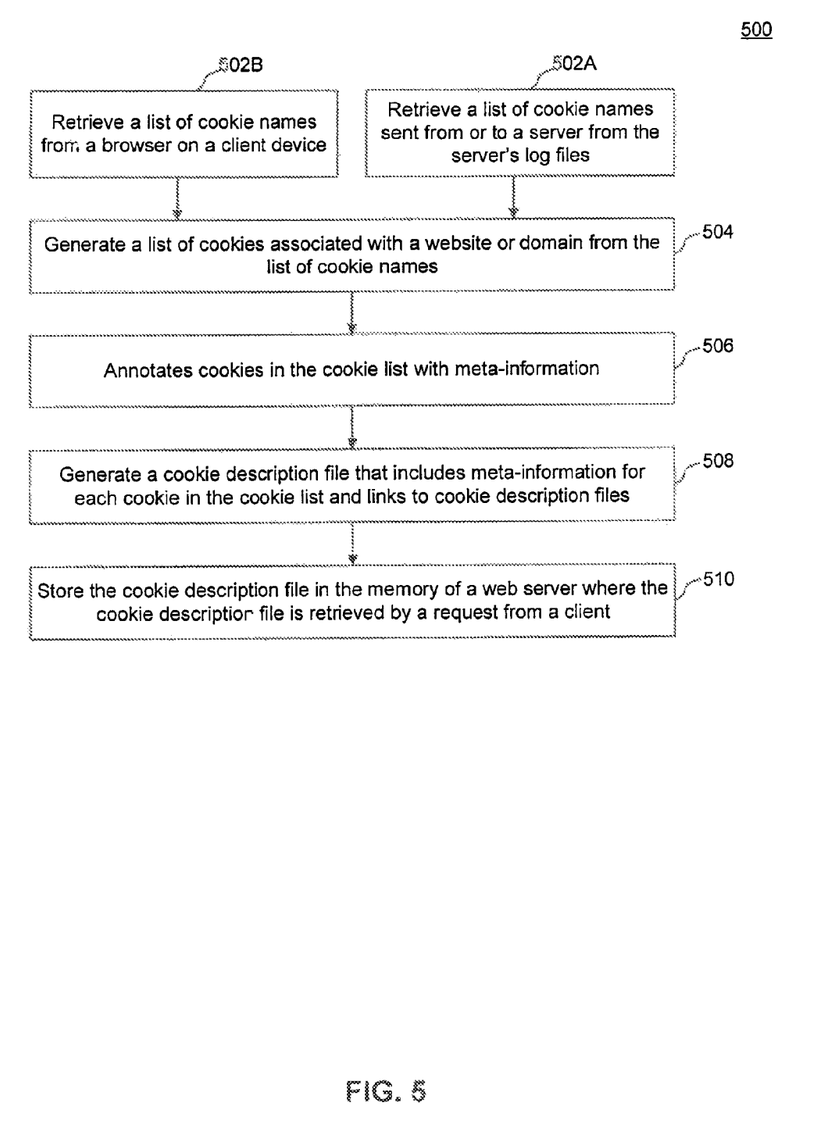
FIG. 5 is a flowchart of a method for generating a cookie description file, according to an embodiment.

FIG. 5 is a flowchart 500 of a method for generating a cookie description file that is stored in a well-known location in the client-server environment (stages 502-510), according to an embodiment.

At stage 502, a list of cookie names is retrieved. Stage 502 may include stage 502A and stage 502B. In stage 502A, cookie names are retrieved from browser 114 executing on client 106. In stage 502B, cookie names are retrieved from a server log on web server 104 that stores cookie names for cookies 110 that were requested from, or transmitted to, web server 104.

At stage 504, a list of cookies associated with a website or a domain name is generated from a list of cookie names.

At stage 506, cookies in the list generated in stage 504 are annotated with meta-information specific to each cookie. For example, the meta-information in a form of key-value pairs may be configured and/or generated by a system administrator. Once generated, meta-information is annotated to each cookie 110 in the cookie list.

At stage 508, a cookie description file is generated. Once cookies 110 are annotated with meta-information, cookie description file 112 is generated. In addition to meta-information, cookie description file 112 may include links 212 to other cookie description files. Additionally, cookie description file 112 may include web addresses that include additional information associated with cookies 110 included in cookie description file 112.

At stage 510, a cookie description file is stored in a well-known location. For example, cookie description file 112 is stored in a well-known location in domain 201 from where it may be retrieved by clients 106.

FIG. 6 is an example computer system 600 in which embodiments of the present invention, or portions thereof, may be implemented as computer-readable code. For example, the components or modules of system 100, such as browser 114, cookie parser 116, cookie viewer 117, etc., may be implemented in one or more computer systems 600 using hardware, software, firmware, tangible computer-readable media having instructions stored thereon, or a combination thereof and may be implemented in one or more computer systems or other processing systems. Modules and components in FIGS. 1-5 may be embodied in hardware, software, or any combination thereof.

Client 106 or web server 104 may include one or more computing devices. Client 106 or web server 104 may include one or more processors 602, one or more non-volatile storage mediums 604, one or more memory devices 606, a communication infrastructure 608, a display screen 610 and a communication interface 612.

Processors 602 may include any conventional or special purpose processor, including, but not limited to, digital signal processor (DSP), field programmable gate array (FPGA), and application specific integrated circuit (ASIC).

GPU 614 is a specialized processor that executes instructions and programs, selected for complex graphics and mathematical operations, in parallel.

Non-volatile storage 604 may include one or more of a hard disk drive, flash memory, and like devices that may store computer program instructions and data on computer-readable media. One or more of non-volatile storage device 604 may be a removable storage device.

Memory devices 606 may include one or more volatile memory devices including but not limited to, random access memory. Communication infrastructure 608 may include one or more device interconnection buses such as Ethernet, Peripheral Component Interconnect (PCI), and the like.

Typically, computer instructions are executed using one or more processors 602 and one or more GPUs 614. Computer instructions can be stored in non-volatile storage medium 604 or memory devices 606. Computer instructions may be stored on a computing device in a compiled file, an executable file or a dynamically linked libraries or objects. Computer instructions may also be compiled on a computing device prior to execution or interpreted on the computing device. In a non-limiting example, computer instructions may be included in a routine, a subroutine, or layers of a software stack that are manipulated by processors 602 or GPUs 614.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device(s), causes a data processing device to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for generating a cookie description file, comprising:
   retrieving a plurality of cookie names;
   generating a plurality of cookies associated with the plurality of cookie names;
   annotating each cookie in the plurality of cookies with meta-information specific to each cookie, wherein the meta-information is included in the key-value format;
   generating a cookie description file, the cookie description file including the plurality of annotated cookies; and
   storing the cookie description file in a well-known location, wherein the cookie description file is accessible to a plurality of client devices that receive the plurality of cookies associated with the domain.

2. The computer-implemented method of claim 1, wherein the plurality of cookie names are retrieved from a client device.

3. The computer-implemented method of claim 1, wherein the plurality of cookie names are retrieved from a web server that transmits and receives the plurality of cookies.

4. The computer-implemented method of claim 1, wherein the cookie description file includes at least one cookie description file link for accessing another cookie description file that includes meta-information associated with another set of cookies.

5. An article of manufacture including a computer-readable medium having instructions retrieved thereon that, when executed by a computing device, cause the computing device to perform operations for generating a cookie description file, the operations comprising:
   retrieving a plurality of cookie names;
   generating a plurality of cookies associated with the plurality of cookie names;
   annotating each cookie in the plurality of cookies with meta-information specific to each cookie, wherein the meta-information is included in the key-value format;
   generating a cookie description file, the cookie description file including the plurality of annotated cookies; and
   storing the cookie description file in a well-known location, wherein the cookie description file is accessible to a plurality of client devices that receive the plurality of cookies associated with the domain.

6. The article of manufacture of claim 5, wherein the plurality of cookie names are retrieved from a client device.

7. The article of manufacture of claim 5, wherein the plurality of cookie names are retrieved from a web server that transmits and receives the plurality of cookies.

8. The article of manufacture of claim 5, wherein the cookie description file includes at least one cookie description file link for accessing another cookie description file that includes meta-information associated with another set of cookies.

9. A system for generating a cookie description file, comprising:
   a processor executing on a server and coupled to a memory, the processor configured to:
   retrieve a plurality of cookie names;
   generate a plurality of cookies associated with the plurality of cookie names;
   annotate each cookie in the plurality of cookies with meta-information specific to each cookie, wherein the meta-information is included in the key-value format;
   generate a cookie description file, the cookie description file including the plurality of annotated cookies; and
   output the cookie description file for storage in a well-known location, wherein the cookie description file is accessible to a plurality of client devices that receive the plurality of cookies associated with the domain.

10. The system of claim 9, wherein the plurality of cookie names are retrieved from a client device.

11. The system of claim 9, wherein the plurality of cookie names are retrieved from a web server that transmits and receives the plurality of cookies.

12. The system of claim 9, wherein the cookie description file includes at least one cookie description file link for accessing another cookie description file that includes meta-information associated with another set of cookies.

* * * * *